US009245034B2

(12) United States Patent
Massoulie et al.

(10) Patent No.: US 9,245,034 B2
(45) Date of Patent: Jan. 26, 2016

(54) RECOMMENDING CONTENT

(75) Inventors: Laurent Massoulie, Vaucresson (FR); Efstratios Ioannidis, San Francisco, CA (US)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/517,449

(22) PCT Filed: Dec. 20, 2010

(86) PCT No.: PCT/EP2010/070232
§ 371 (c)(1),
(2), (4) Date: Jun. 20, 2012

(87) PCT Pub. No.: WO2011/080138
PCT Pub. Date: Jul. 7, 2011

(65) Prior Publication Data
US 2012/0260165 A1    Oct. 11, 2012

(30) Foreign Application Priority Data
Dec. 21, 2009    (EP) .................................... 09306291

(51) Int. Cl.
*G06F 3/00* (2006.01)
*G06F 17/30* (2006.01)
*G06F 3/048* (2013.01)

(52) U.S. Cl.
CPC .......... *G06F 17/30867* (2013.01); *G06F 3/048* (2013.01)

(58) Field of Classification Search
CPC .......... G06Q 30/0631; H04N 21/4826; H04N 21/4668; G06F 17/3064; G06F 3/048
USPC ....................................................... 715/708
See application file for complete search history.

(56) References Cited

U.S. PATENT DOCUMENTS

| 6,374,145 | B1 * | 4/2002 | Lignoul .......................... 700/17 |
| 2004/0177110 | A1 | 9/2004 | Rounthwaite et al. |
| 2007/0106672 | A1 * | 5/2007 | Sighart et al. ................... 707/10 |
| 2007/0288965 | A1 * | 12/2007 | Murakami et al. .............. 725/46 |

(Continued)

FOREIGN PATENT DOCUMENTS

EP    2060983    5/2009

OTHER PUBLICATIONS

El-Arini et al. "Turning Down the Noise in the Dlogosphere", KOD, Paris, France, Jun. 28-Jul. 1, 2009.
Bahshal el al, "Searching the Blogosphere", Preceeding of the 10th International Workshop of Web and Databases, Beijing, China, Jun. 15, 2007.

(Continued)

*Primary Examiner* — Kieu Vu
*Assistant Examiner* — Andrew Chung
(74) *Attorney, Agent, or Firm* — Jack Schwartz & Associates, PLLC

(57) ABSTRACT

A method for recommending content items to a user is provided. It includes: (i) receiving one of at least an acceptance input and a rejection input from a user in relation to content presented to the user; (ii) in response to an acceptance input, rendering the presented content, or in response to a rejection input, selecting fresh content for presentation; and, (iii) repeating steps (i) and (ii) until a acceptance input is received. Content is selected in dependence on a associated probability associated with that content. The probability is increased in response to an acceptance input, the increase being determined in part on a measure of a predicted reduction in user satisfaction that would be associated with an additional rejection input.

14 Claims, 2 Drawing Sheets

(56) References Cited

U.S. PATENT DOCUMENTS

| | | | |
|---|---|---|---|
| 2008/0189232 A1* | 8/2008 | Dunning et al. | 706/45 |
| 2009/0006442 A1 | 1/2009 | Anderson et al. | |
| 2009/0132459 A1 | 5/2009 | Hicks | |
| 2009/0300547 A1* | 12/2009 | Bates et al. | 715/825 |
| 2011/0016431 A1* | 1/2011 | Grosz et al. | 715/841 |
| 2011/0035674 A1* | 2/2011 | Chenoweth et al. | 715/745 |
| 2011/0061076 A1* | 3/2011 | Ali et al. | 725/46 |
| 2011/0289075 A1* | 11/2011 | Nelson | 707/723 |
| 2012/0084818 A1* | 4/2012 | Ali et al. | 725/46 |

OTHER PUBLICATIONS

Ioannidis et al., "Surfing the Blogosphere: Optimal Personalized Strategies for Searching the Web," INFOCOM, 2010 Proceedings IEEE, Mar. 14, 2010, pp. 1-9.

Adomavicius et al., "New Recommendation Techniques for Multicriteria Rating Systems", IEEE Intelligent Systems, vol. 22, No. 3, May 1, 2007, pp. 48-55.

Search Report Dated May 19, 2011.

Aneiros et al., "Recommendation-Based Collaborative Browsing Using Bookmarks", Proceedings of the 2004 Iadis International Conference e-Society, Avila, Spain, Jul. 16, 2004, pp. 718-725.

Phatak et al., "Clustering for Personalized Mobile Web Usage", Proceedings of the 2002 IEEE International Conference on Fuzzy Systems, vol. 1, (2002), pp. 705-710.

Anonymous, "Discover, share, and organize the hottest links online", http://delicious.com, Feb. 10, 2015, pp. 1-2.

Anonymous, "Digg—What the Internet is talking about right now", http://digg.com, Feb. 10, 2015, pp. 1-37.

Anonymous, "reddit: the front page of the internet", http://reddit.com, Feb. 10, 2015, pp. 1-4.

Anonymous, "StumbleUpon is a giant collection of the best pages on the Internet", http://www.stumbleupon.com, Feb. 10, 2015, pp. 1-2.

Anonymous, "StumbleUpon's Recommendation Technology", http://www.stumbleupon.com/technology/, Feb. 10, 2015, pp. 1-2.

http://google.com, Feb. 10, 2015, p. 1.

* cited by examiner

RECOMMENDING CONTENT

This application claims the benefit, under 35 U.S.C. §365 of International Application PCT/EP2010/070232, filed Dec. 20, 2010, which was published in accordance with PCT Article 21(2) on Jul. 7, 2011 in English and which claims the benefit of European patent application No. 09306291.7, filed Dec. 21, 2009.

FIELD OF THE INVENTION

The present invention relates to content recommendation, in particular content recommendation to a user.

BACKGROUND OF THE INVENTION

The sheer volume, diversity and varying quality of content on the web—ranging from personal blogs to professional news-sites—makes the discovery of current, interesting information a challenging task. Recommendation engines are programs giving online users (websurfers) daily recommendations on which websites to view. Typically these systems employ feedback from websurfers.

In Delicious, for example, surfers tag blogs with keywords describing the type of content appearing in the site; tagged websites then appear on the Delicious website as an aid to daily websurfing. The recommendation engines Digg and Reddit also employ surfer feedback: surfers vote for websites they visit, and the sites display recent content with high voting scores.

An alternative approach is employed by the recommendation engine StumbleUpon. StumbleUpon implements a toolbar, giving websurfers the option between two buttons. The first, labeled "Stumble!", generates a randomly selected website. The second, labeled "I like this" allows surfers to indicate they like the website they see. Websurfers are thus presented with a sequence of different websites, until one that matches their interests is found.

The exact algorithm used by StumbleUpon to recommend websites to its users is proprietary. In broad terms, StumbleUpon learns through a registered user's feedback (i.e., clicks of the "I like this" button) which websites she or he likes; recommendations are then made by showing the user websites that have been recommended by other registered users with similar preferences. StumbleUpon also leverages social-networking information to make recommendations. In particular, registered users can declare their friends. Assuming that friends should have common interests, StumbleUpon exploits this information to recommend websites to users when selected by their friends.

A similar approach is adopted by El-Arini et al [K. El-Arini, G. V. D. Sharaf, and C. Guestin. *Turning down the noise in the blogosphere*", in KDD, 2009]. They propose a mechanism for recommending a list of websites to surfers that maximizes a personalized "coverage function", indicating whether the suggested websites cover topics of interest to the surfer. A similar minimal feedback scheme as Stumble Upon is employed, based on whether suggested websites are approved or disapproved by the surfer.

An altogether different approach to recommendation engines is adopted by search engines like Google and Blogoscope [N. Banshal and N. Koudas. *"Searching the Blogosphere"*, in WebDB, 2007]. WEbsurfers submit queries to such engines, requesting specific content. These engines regularly crawl the World Wide Web and store information about the content published in every website. This information is stored and processed, and answers to a user's queries are given by matching these queries to relevant websites obtained through crawling the web.

Digg relies on the participation of websurfers through tag submission, which they may not always be able or willing to perform. In general, Digg, Delicious and Reddit lack personalization: the recommendations made are collective, and are not designed to meet the needs of any particular websurfer.

Both StumbleUpon and El-Arini et al. personalize the search for content to a particular websurfer. Moreover, they do so with minimal feedback. Tagging is not required; instead, users need only declare which sites they like and, in StumbleUpon, optionally provide social networking information.

El Arini et al. solve an optimization problem, in which they try to match websites to each websurfer's personal interests. Their solution is not optimal, but is within a constant factor of the optimal. Nonetheless, the approach proposed by El Arini et al. is not content-agnostic. It requires knowledge of the nature of the content published by websites. To obtain this information, a central server must crawl the web periodically and discover and analyse what type of content is published at different websites. This server needs to have considerable storage capacity to store and analyse the data it collects.

The exact mechanism employed by StumbleUpon is proprietary, so it is not possible to assess its operation. However, it is certainly a centralized mechanism: the preferences of users are aggregated and stored at a central server. Moreover, it is not possible to know whether the method used by StumbleUpon indeed matches websites to each individual interests optimally, or simple heuristics are used to offer website suggestions.

Search engines like Google and Blogscope have the following disadvantages. First, like El-Arini et al., they are by definition content-aware, and require extensive, frequent crawling of the web, and the storage and processing of terabytes of information. Second, they operate under the assumption that a websurfer knows what she or he wishes to find. However, eliciting a websurfer's interests is not always straightforward: the websurfer may not be able to declare what type of content she or he is interested in before actually being presented with it, and that is the reason why recommendation engines like StumbleUpon have been proposed as alternatives.

Finally, all of the above-mentioned approaches are centralized: recommendations are made by a central server that aggregates information, stores it, and processes it to give recommendations.

SUMMARY OF THE INVENTION

According to one aspect of the invention, there is provided a method for recommending content items to a user, including: (i) receiving one of at least a first input and a second input from a user in relation to content presented to the user; (ii) in response to a first input, rendering the presented content, or in response to a second input, selecting fresh content for presentation; and, (iii) repeating steps (i) and (ii) until a first input is received, wherein content has a probability associated therewith, and content is selected in dependence on the associated probability of that content, the first and second inputs being received at a user interface of a user device, the selection of the content being performed locally at the user device.

The first input can be regarded as an acceptance of the content, and the second input can be regarded as a rejection of the content, the rejected content preferably being discarded.

Preferably, the probably associated with a given content is increased each time a first input is received from the user for that content. Yet more preferably, the magnitude of the increase in the probability associated with given content is dependent at least in part on said probability before the increase.

In one embodiment, a measure of system performance (that is, a measure of how the system performs in giving user satisfaction) is obtained in dependence on the number of times a user enters a second input before entering a first input. The measure is preferably obtained from a functional relationship between performance and the number of second inputs received before a first input is received. The functional relationship may but need not be obtained empirically from user experiments. In fact, it has been found that there is more than one decreasing function that can be used, and that the function, also referred to as a rating function, can be seen as a system parameter.

Preferably, the decrease, if any, in the predicted system performance that would have occurred had the user entered a further second command instead of a first command is determined. For example, if a user enters Y second inputs before entering a first command, the decrease is simple the system performance after Y+1 second inputs relative to the system performance after Y second inputs. This, in effect, can be seen as a measure of a predicted reduction in user satisfaction associated with an additional second input. There are however other ways in which the magnitude of the increase in the probability of a given content can be dependent on the number of second inputs entered by the user before the user enters a first input in respect of that content.

A counter is preferably provided to count the number of second inputs, the counter having a counter value that is incremented each time a user enters a second input. The counter value reached when a first input is entered can then used to update the probability associated with the content rendered in response to the first input. In response to the first input being entered, the counter value is preferably re-set.

Preferably, the magnitude of the increase in probability is dependent on previous recommendation probabilities.

According to another aspect of the present invention, there is provided a user device for recommending content to a user including: display means arranged to present content to a user; a user interface arranged to receive one of at least a first input and a second input in relation to content presented to a user, the display means being arranged to display the presented content in response to a first input; and, section means arranged, in response to a second input, to select fresh content for presentation, each content having a probability associated therewith, the selection means being arranged to select content in dependence on the associated probability of that content.

The selection means is preferably arranged to increase the probably associated with a given content each time a first input is received from the user for that content. Yet more preferably, the magnitude of the increase is dependent at least in part on said probability before the increase. This allows the interest a user has in content to be taken into account when presenting the same or similar content to that user again.

According to yet another aspect of the invention, there is provided a method for recommending content items to users, said method using a user interface comprising at least two options, one option allowing users to approve a content item and the other option allowing users to discard a content item, wherein a new content item is presented to the users when they select option and discard a content item, characterized in that said method uses probabilistic rules for recommending content items to users, in that said probabilistic rules for recommending content items to users are updated when a user selects option and approves a content item, with the approved content item's probability being increased and in that the magnitude of the increase is evaluated as a function of previous recommendation probabilities and the number of content items viewed and discarded by said user before it approved said content item.

According to an embodiment, a counter is increased each time a user selects option discarding a content item, and in that, when said user selects option and approves a content item, the value of said counter is read, is used to compute the probabilities of displaying a particular content item to a user and is reset to zero.

Preferably, the computation of new content display probabilities is performed by one or more of the following:
assuming that user satisfaction is a decreasing function of the number of times it selects the option discarding a content item before accessing an approved content item;
posing an optimization problem, in which user satisfaction is to be maximized, as a function of the content display probabilities; and
updating the content display probabilities every time the option is selected so that the quantities reflecting the content display probabilities automatically adapt and converge to the content display probabilities that maximize user satisfaction.

According to an embodiment, communities of users are formed and the recommendation of content items to users is performed based on the membership of users to said communities.

Preferably, a common set of probabilities of displaying a particular content is used for all users members of a community.

According to an embodiment, said set of probabilities is updated based on a counter of all users members of the community.

Advantageously, users designate at least one content category that interests them and in the recommendation of content items to users is performed based on the interest of users in this content category.

According to an embodiment, a set of probabilities is maintained per user and content category.

The advantages provided by the present invention are the following:
The method according to the present invention is decentralized: it is implemented as an application running at each individual user's machine.
The method according to the present invention makes recommendations to websurfers in a manner that reduces the number of websites viewed before one that the websurfer likes is presented.
The method according to the present invention reduces the need for tagging content. Moreover, it does not require that users explicitly state their interests on a given day—though such information can be used to improve the performance of our mechanism.
The method according to the present invention is content-oblivious: it does reduces the need for a priori knowledge of the nature of the content stored at each website. It does not require frequent crawling of the web and the subsequent storage and processing of terabytes of data.
The performance of the method according to the present invention may be improved through the use of social networking information.

BRIEF DESCRIPTION OF THE DRAWINGS

The invention will now be further described, by way of example only, and with reference to the following drawings, in which.

DETAILED DESCRIPTION OF THE EMBODIMENTS OF THE INVENTION

Figure 1:
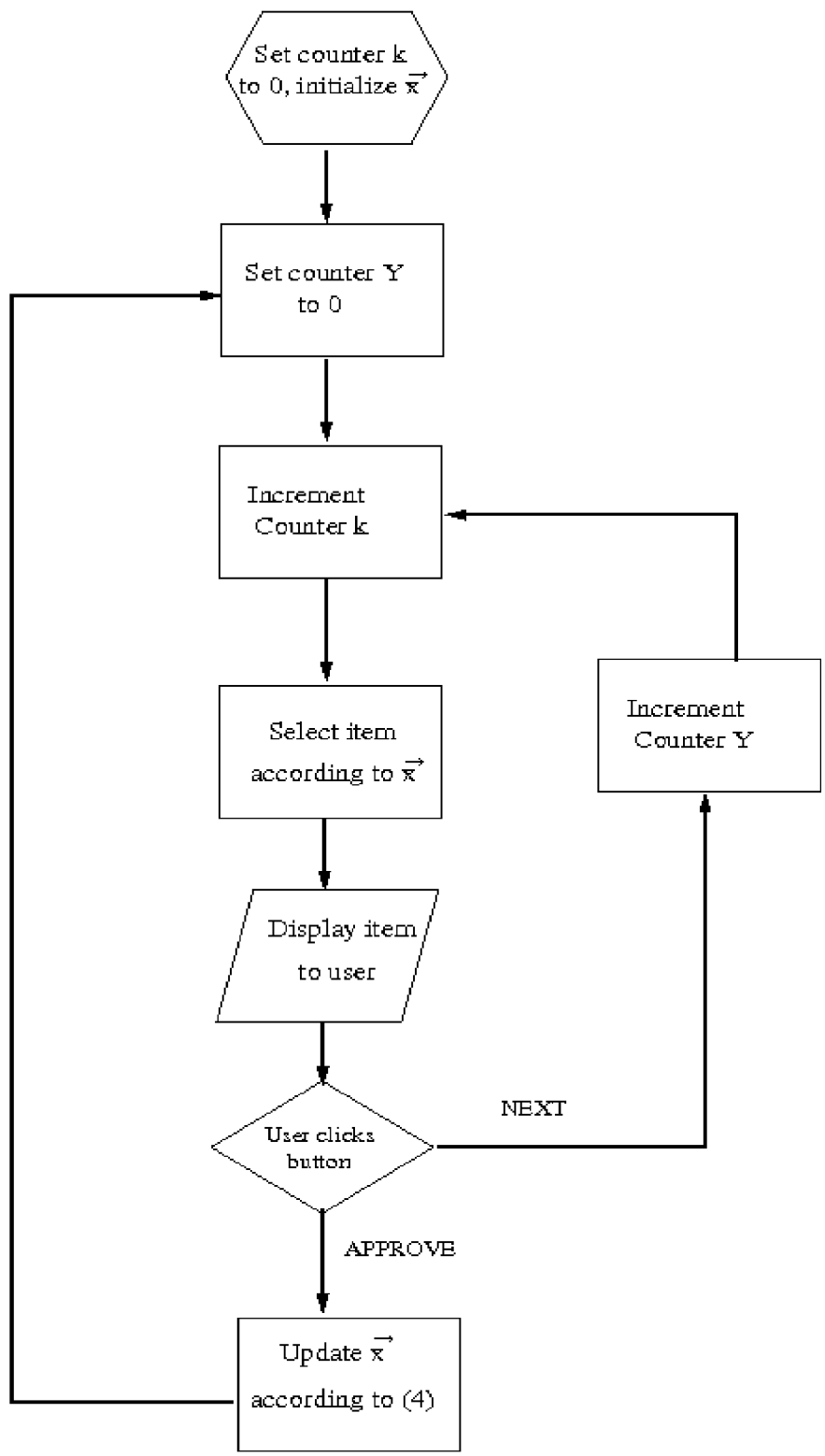
FIG. 1 shows a diagram representing the method according to the present invention; and, FIG. 2 shows a system for recommending content.

In the following detailed description, we assume that content items are websites, and that a day corresponds to a search session.

In the context of the present invention, the web is modeled as a set of N websites. These websites maintain content that covers M different topics, such as, e.g., sports, politics, movies, health, etc. Periodically, the content displayed at each website changes: we denote by $p_{w,f}$ the probability that the content presented in site w covers topic f, where w=1, ..., N and f=1, ..., M. For each website w, we call the vector $\vec{p}_w = [p_{w,1}, \ldots, p_{w,M}]$ as the publishing strategy of the website.

In general, more than one topic (e.g., sports and health) can be covered by a certain website at a given point in time; the expected number of topics covered by w will be $\Sigma_f p_{w,f}$.

We assume that, for every topic f, there exists one website w that covers this topic with positive probability—i.e., $p_{w,f} > 0$.

Moreover, we assume that websites have high churn, and the content changes frequently (as, e.g., in news sites like nytimes.com or popular blogs like tmz.com). As a result, we will make the assumption that content is presented independently each time a website w is visited.

We assume that each day, a given websurfer is interested in topic f with some probability $d_f$, where $\Sigma_f d_f = 1$.

We call $\vec{d} = [d_1, \ldots, d_M]$ the interest profile of the surfer.

The surfer visits websites daily by using a mechanism that works as follows: the mechanism recommends a sequence of websites to the surfer, and the surfer keeps viewing these sites until she or he finds a website covering the topic that interests her or him.

The method according to the present invention can, according to an embodiment, be implemented as a toolbar on the surfer's web-browser: the surfer would be presented with two different buttons, one called "next" and the other called "select". Clicking the first would generate a new website, while clicking the second would indicate that a topic the surfer is interested in is found.

At each click of the "next" button, the website recommended is chosen by the mechanism from a probability distribution over all sites: we denote by $x_w$ the probability that the mechanism recommends website w, where $\Sigma_w x_w = 1$. This probability distribution is specific to the user or to the community of users.

We refer to the vector $\vec{x} = [x_1, \ldots, x_N]$ as the surfing strategy of the mechanism. As we will see, the mechanism will use the surfer's feedback to update this strategy from one day to the next, in a manner that will be described below.

Let Y be the number of sites the surfer visits until it locates a topic it is interested in. Moreover, let R(Y) be a function rating the performance of the system, given that the topic is found within Y steps. We treat R as a system parameter internal to the mechanism, and make the following assumption:

Assumption 1. The rating function $R: \mathbb{N} \to \mathbb{R}$ is (a) non-increasing and (b) summable, i.e., $\Sigma_{k=1}^{\infty} |R(k)| < \infty$.

Considering non-increasing rating functions is natural: the longer a surfer has to wait, the lower the system's rating should be. The assumption on the summability is technical; note that it holds if R has a finite support and, e.g., visiting more that 30 websites gives a zero rating to the system.

Denote by $\mathbb{E}_{\vec{x}}[R(Y)]$ the expected system rating when the surfing strategy is $\vec{x}$.

Intuitively, given that the rating of the system decreases with the number of visits the surfer makes, the mechanism should choose a surfing strategy that maximizes the expected rating, by making the latter appropriately small.

The optimization problem described by (1) preferably relates to surfing strategies in which sites are each visited with probability at least ε, i.e., the feasible domain is restricted to $$D_\varepsilon = \left\{ \vec{x} : \sum_w x_w = 1 \text{ and } x_w \geq \varepsilon \right\}. \quad (2)$$

Note that $$D_\varepsilon \neq \emptyset \text{ if } \varepsilon \leq \frac{1}{N}.$$

Moreover, if $\varepsilon < \varepsilon'$, then $D_{\varepsilon'} \subseteq D_\varepsilon \subseteq D_0$ where $D_0$ includes all possible surfing strategies.

The main reason to restrict the domain to $D_\varepsilon$, where $\varepsilon > 0$, has to do with website discovery—we want to ensure the websurfer has a chance to visit a website she likes. It is also useful for "tracking" changes in $\vec{d}$ or $\vec{p}_w$: if a website is never visited, the mechanism will never have the opportunity to adapt to the fact that, e.g., it has started covering sports, and thereby may now meet the interests of the surfer. We note that, if $\varepsilon > 0$ is small, an optimal strategy to $D_\varepsilon$ will not be much worse than the optimal strategy in $D_0$.

The surfing strategy $\vec{x}$ of the mechanism can change from one day to the next based only on the minimal feedback given by the surfer; we denote by $\vec{x}_k$, k=1, 2, ..., the strategy on day k. For $\vec{x} \in \mathbb{R}^N$, let $$\prod_{D_\varepsilon}(\vec{x}) = \underset{\vec{y} \in D_\varepsilon}{\operatorname{argmin}} \|\vec{y} - \vec{x}\|_2. \quad (3)$$

be the orthogonal projection to the domain $D_\varepsilon$. Since $D_\varepsilon$ is closed and convex, $\Pi_{D_\varepsilon}$ is well defined—there exists a unique $\vec{y} \in D_\varepsilon$ minimizing the distance from $\vec{x}$.

Moreover, as $D_\varepsilon$ is a convex polyhedron, $\vec{y}$ can be computed by a quadratic program. In fact, there are known algorithms computing $\Pi_{D_\varepsilon}$ in O(N) time.

Given the feedback of the surfer on the k-th day, the strategy $\vec{x}_k$ is updated according to the following scheme:

$$\vec{x}(k+1) = \Pi_{D_\varepsilon}(\vec{x}(k) + \gamma(k) \cdot \vec{g}(k)), k=1, 2, \ldots \quad (4)$$

The term $\gamma(k) \in \mathbb{R}_+$ is a gain factor; if it decreases with k, feedback given later has smaller impact on the surfing strategy.

The term $\vec{g}(k) \in \mathbb{R}_-^N$ is the vector forcing the change on the surfing strategy based the surfer's feedback.

In particular, $\vec{g}(k)$ has the following coordinates:

$$g_w(k) = \begin{cases} -\dfrac{Y(k)\Delta R(Y(k)+1)}{x_w(k)}, & \text{if the surfer selects } w \\ 0, & \text{otherwise,} \end{cases} \quad (5)$$

where $Y(k)$, $k=1, 2, \ldots$ is the number of sites a surfer visits on the k-th day until it locates a topic she or he is interested in, and $$\Delta R(k) = \begin{cases} R(1), & \text{if } k = 1, \\ R(k) - |R(k-1)|, & \text{if } k > 1. \end{cases} \quad (6)$$

Note that, to compute this, all the mechanism needs to know is Y, R and $\vec{x}$.

The rating function R is a system parameter, while $\vec{x}$ is maintained by the mechanism and used to recommend websites. To compute Y, the mechanism needs to keep track of how many websites it has shown to the surfer; the only feedback given by the surfer is the indication that her or his interests have been met. In particular, the mechanism does not need to know—and the surfer does not need to declare—which is the interesting topic covered by website w. In fact, the mechanism is oblivious to even what the topics $f=1, \ldots, M$ are.

The system explained above can be summarized as follows.
1) The system is installed, in one embodiment, at the user's browser
2) The system displays two buttons to the user, a "next" button and a "select" button
3) To use the system, the user clicks the "next" button and is displayed a new website. The user keeps clicking "next" until a website he or she likes is displayed by the system.
4) Once a website that the user likes is shown, the user lets the system know about this by clicking the "select" button.
5) The system stores a vector of probabilities x_w, that sum up to one. We call this the "surfing strategy of the system".
6) Each time the user clicks the next button, the system displays a website selected at random according to the vector of probabilities x_w. That is, it shows website w with probability x_w
7) The system maintains a counter Y, keeping track of how many times the user has clicked the next button since the last click of the select button
8) The system contains, as a design parameter, a function R that satisfies Assumption 1. This is a design parameter: intuitively R(Y) gives a numerical value how satisfied the user will if he or she has to see Y websites before being presented with a website that she likes. Any R that satisfies Assumption 1 can be used, so a wide range of user preferences with respect to their level of satisfaction after Y viewings are captured by the system. We call this R the "rating function".
9) Each time the user clicks the "select" button, the system uses the counter Y to update the vector of probabilities x in the following manner:
   a. Let w be the website at which the user clicked "select"
   b. The mechanism creates a vector g, of the same length as the vector of probabilities x, such that g_w is equal to $-Y*(R(Y+1)-R(Y))/x\_w$ and zero everywhere else (equation 5)
   c. In words, the formula $-Y*(R(Y+1)-R(Y))/x\_w$ means
      i. Compute R(Y+1), R(Y) where R is the design parameter function capturing how satisfied the user is when he or she has viewed Y websites it does not like before viewing a website he or she views a website that she likes, and Y is the counter keeping track of how many times the viewer has clicked next before clicking select.
      ii. Subtract R(Y) from R(Y+1).
      iii. Multiply the result by Y
      iv. Divide the result by x_w, where x_w is the probability that website w is selected
      v. Multiply the result by −1
   d. The above vector g, which is zero everywhere except at g_w, where it is equal to $-Y*(R(Y+1)-R(Y))/x\_w$, this quantity being computed as in c. above, is multiplied to a numerical value gamma and added to x
   e. The numerical value gamma (known to the person skilled in the art as a gain factor) can be any value, that decreases every time that the surfing vector is updated.
   f. The result of the addition of these two vectors, (that is the sum of the vector of probabilities x and the vector g multiplied by the gain factor gamma) is projected to the set of all vectors x whose coordinates are (a) larger than a parameter epsilon, which is arbitrary but small and (b) sum up to one (see formula (4))
   g. The projection to the above set of vectors, known to the man skilled in the art as the orthogonal projection to a closed convex polyhedral set, can be computed through several methods. In one embodiment, it can be computed by the solution of what is called by the man skilled in the art a quadratic program. There are other, alternatives, all of which are well known to the man skilled in the art.
   h. The above description of how the vector of probabilities is updated can be understood through following equations: Eq. (2), defining the set of vectors summing up to one whose coordinates are larger than epsilon, Eq. (3), defining the orthogonal projection, which is a known definition, (4), defining how the vector of probabilities is adapted, and (5) and (6), defining how the vector g is computed With regard to the function R of Equation (5), R(Y+1) can be seen as being the user satisfaction that the user would have at finding the web site W after Y+1 clicks (that is Y+1 second inputs). That is, it is the notional satisfaction predicted after one more click than was actually needed to find the web site W (which was accepted with a first input after Y clicks). If the benefit in finding the site in Y rather than Y+1 clicks is large, then the user would be particularly dissatisfied at not finding it in Y clicks but only in Y+1 clicks. Consequently, the value R(Y)−R(Y+1) is of large magnitude, and the probability associated with the website W is increased by a large amount. Otherwise, if the benefit is small, W is only increased by a small amount.

Figure 2:
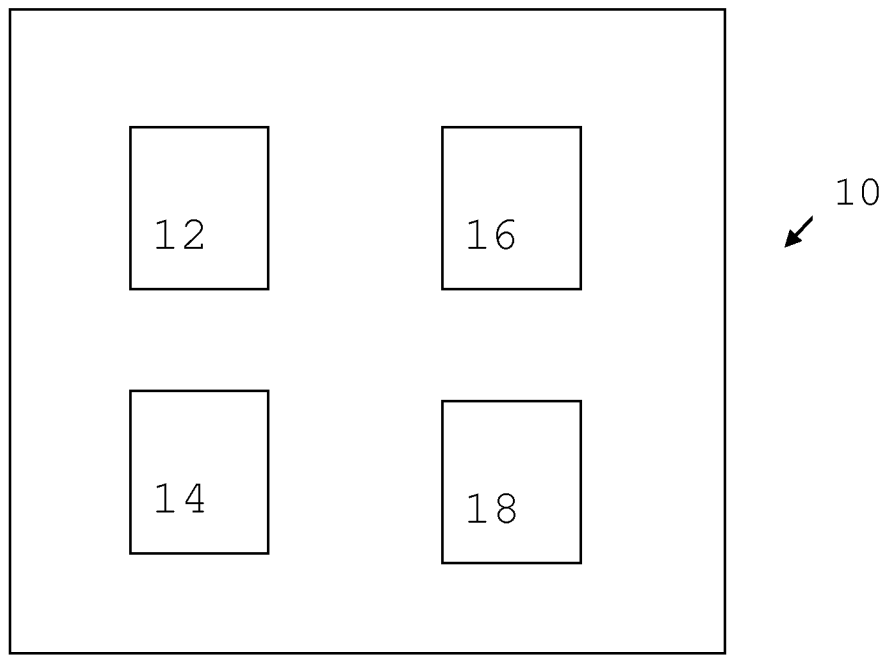

Referring to FIG. 2, the system 10 can be viewed as having a display 12, a user interface 14, selection means 16 for selecting content to present to a user and a counter 18 for counting the number of times a user clicks "next" before clicking "select", the selection means being arranged to select content as explained above. In particular, the selection means has a processor for processing data and a memory for storing, for example, the probability associated with each content.

The system will preferably be implemented in a hand held user device, for example a device having wireless connectivity for downloading content to be displayed. The content may be downloaded through an opportunistic network.

In our analysis, apart from considering the mechanism (4) when the surfer is isolated, we will also consider the case when the surfer is part of a surfer community $C=\{1, \ldots, |C|\}$. Each surfer $s \in C$ has its own interest profile $\vec{d}_s$.

Each day the topic it is interested in is chosen independently of the topics that interest other surfers. Furthermore, each surfer executes the minimal feedback mechanism outlined in the previous section. The difference from the single-surfer case will be that these mechanisms will exploit the existence of the surfer community in the manner described below.

To begin with, all mechanisms implement a common surfing strategy $\vec{x}$ everywhere in the community. Moreover, at the end of each day, the feedback collected from each surfer is communicated among the mechanisms and is aggregated; the aggregated feedback is then used to update the common strategy.

More specifically, let $Y_s(k)$, $k=1, 2, \ldots$ be the number of sites surfer $s \in C$ visits on the k-th day and $\vec{g}_s(k)$ be the change induced by the feedback of surfer s on day k, given by (5).

The latter quantities are computed individually by each mechanism and, at the end of each day, are communicated among all surfers.

As in (1a), we denote by $F_s(\vec{x}) = \mathbb{E}_{\vec{x}}[R(Y_s)]$ the expected rating of the mechanism at surfer s. Moreover, we denote by $$\vec{g}_C = \frac{1}{|C|} \sum_{s=1}^{|C|} \vec{g}_s \text{ and } F_C(\vec{x}) = \frac{1}{|C|} \sum_{s=1}^{|C|} F_s(\vec{x}) \qquad (7)$$

the average change vector and the average system rating among all surfers in the community.

The common surfing strategy is then updated as follows:

$$\vec{x}(k+1) = \Pi_{D_\epsilon}(\vec{x}(k) + \gamma(k) \cdot \vec{g}_C(k)) \ k=1, 2, \ldots \qquad (8)$$

In other words, the common surfing strategy is updated as in (4), the only difference being that, instead of the individual vectors $\vec{g}_s$, the community average $\vec{g}_C$ is used.

We will denote by $\partial_c$ the maximum $l_1$ distance between the interest profiles of surfers in the community, i.e., $$\delta_C = \max_{s,s' \in C} \|\vec{d}_s - \vec{d}_{s'}\|_1 = \max_{s,s' \in C} \sum_w |d_{s,w} - d_{s',w}| \qquad (9)$$

We will call $\partial_c$ the diameter of the community. Intuitively, we will be interested in the case where the diameter is small, as surfers in the same community should have similar interests.

The case where a surfer is interested in any of k different topics each day can easily be reduced to the single-topic case, by redefining the set of topics to be the set of topic k-tuples.

Interestingly, even if our model is extended this way, mechanism (4) would remain unaltered: this is because, as noted, it is entirely oblivious to the nature of the topics f.

The assumption that websites generate independent content would not apply to websites that are updated infrequently.

In practice, our mechanism should avoid visiting such sites more than once, e.g., through blacklisting them if the surfer does not approve them during a search.

The mechanism according to the present invention maintains a vector $\vec{x}$ whose dimension is N, the number of websites. Given the number of websites on the Internet, this is clearly impractical. One way to avoid this is to restrict the mechanism to a subset of all websites; this is not satisfactory, as it would limit the surfer's choices.

Alternatively, we can group websites into clusters of similar such sites. By keeping the number of such clusters smaller than N and by using the same probability for each website in a cluster, we can reduce the complexity of our mechanism while maintaining reasonable performance.

The embodiments described above are aimed at solving the drawbacks of the prior art solutions. They can be seen as proving a way to design a probabilistic strategy for recommending content items to users so that users access content of interest quickly In conclusion, the embodiments illustrate a method for recommending content items to a user is provided. It includes: (i) receiving one of at least an acceptance input and a rejection input from a user in relation to content presented to the user; (ii) in response to an acceptance input, rendering the presented content, or in response to a rejection input, selecting fresh content for presentation; and, (iii) repeating steps (i) and (ii) until a acceptance input is received. Content is selected in dependence on a associated probability associated with that content. The probability is increased in response to an acceptance input, the increase being determined in part on a measure of to predicted reduction in user satisfaction that would be associated with an additional rejection input.

The above specification, examples and drawings provide a complete description of the method according to the present invention. Since many embodiments of the invention can be made without departing from the spirit and scope of the invention, the invention resides in the claims herein after appended.

The invention claimed is:

1. Method for recommending content items, comprising:
   (i) receiving one of at least a first input and a second input from a user in relation to presented content;
   (ii) in response to a first input, rendering the presented content, or in response to a second input, increasing a count value indicative of a number of second inputs received prior to receipt of a first input and selecting fresh content for presentation; and,
   (iii) repeating (i) and (ii) until a first input is received,
   wherein content has a probability associated therewith, and content is selected in dependence on the associated probability of that content, the first and second inputs being received and the selection of the content being performed locally; and,
   wherein the probability associated with a given content is increased each time a first input is received from the user for that content, a magnitude of the increase being dependent on the count value for said content; and
   computing a measure of system performance based on the count value upon receipt of a first input.

2. A method as claimed in claim 1, wherein the magnitude of the increase in the probability associated with given content is dependent at least in part on said probability before the increase.

3. A method as claimed in claim 1, wherein the measure of system performance is obtained in dependence on the number of second inputs received before receipt of a first input and wherein the magnitude of the increase is at least in part determined by a decrease, if any, in the predicted system performance associated with an additional second input.

4. A method as claimed in claim 1, wherein the magnitude of the increase is dependent on previous recommendation probabilities.

5. A method as claimed in claim 1, wherein a counter value is incremented each time a second input is entered, the counter value reached when a first input is entered being used to update the probability associated with the content rendered in response to the first input.

6. A method as claimed in claim 5, wherein the counter value is reset in response to the first input being entered.

7. A device for recommending content including:
a display arranged to present content;
an interface arranged to receive one of at least a first input and a second input in relation to content presented, the display being arranged to display the presented content in response to a first input;
a counter arranged to calculate a count value, said counter increasing the count value for each second input received prior to receipt of a first input; and
a selector arranged, in response to a second input, to select fresh content for presentation, each content having a probability associated therewith, the selector being arranged to select content in dependence on an associated probability of that content, wherein the selector is arranged to increase a probability associated with a given content each time a first input is received for that content, a magnitude of the increase being dependent on the count value for said content, said device being further arranged to compute a measure of system performance based on the count value upon receipt of a first input.

8. A device as claimed in claim 7, wherein the magnitude of the increase is dependent at least in part on said probability before the increase.

9. A device as claimed in claim 7, wherein the count value reached when a first input is received can be used to update the probability associated with the content rendered in response to the first input.

10. A device as claimed in claim 7, wherein the display is arranged to display a browser, and wherein the browser includes a plurality of buttons, each corresponding to a respective input.

11. A device as claimed in claim 7, wherein the selector is arranged to determine the magnitude of the increase at least in part by the decrease, if any, in a measure of satisfaction associated with an additional second input.

12. Method for recommending content items, said method comprising at least two options, a first option indicating approval of a content item and a second option allowing discarding of a content item, wherein a new content item is presented when the second option is selected and the content item is discarded, wherein said method uses probabilistic rules for recommending content items, said probabilistic rules for recommending content items being updated when the first option is selected indicating approval of a content item, with the approved content item's probability being increased and a magnitude of the increase being evaluated as a function of previous recommendation probabilities and the number of content items viewed and discarded before approving said content item, and computing a measure of system performance based on a count value indicative of an amount of discarded content items prior to receipt of an approval of content.

13. Method for recommending content items, including:
(i) receiving one of at least a first input and a second input in relation to content presented;
(ii) in response to a first input, rendering the presented content, or in response to a second input, increasing a count value indicative of a number of second inputs received prior to receipt of a first input selecting fresh content for presentation; and,
(iii) repeating (i) and (ii) until a first input is received,
wherein content has a probability of being selected associated therewith, and content is selected in dependence on the associated probability, the probability being increased in response to a first input, wherein the increase is determined at least in part on a measure of a predicted reduction in user satisfaction associated with an additional second input beyond the count value, and computing a measure of system performance based on the count value upon receipt of a first input.

14. A method as claimed in claim 13, wherein the first and second inputs are received, and selection of the content is performed locally.

* * * * *